US012587272B2

(12) United States Patent
Chakraborty et al.

(10) Patent No.: US 12,587,272 B2
(45) Date of Patent: Mar. 24, 2026

(54) DATA TRAFFIC SCALING FOR COMMUNICATION SATELLITE

(71) Applicant: Microsoft Technology Licensing, LLC, Redmond, WA (US)

(72) Inventors: Tusher Chakraborty, Bellevue, WA (US); Jayanth Ganesh Shenoy, Katy, TX (US); Deepak Vasisht, Champaign, IL (US); Om Jit Singh Chabra, Tucson, AZ (US); Ranveer Chandra, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 376 days.

(21) Appl. No.: 18/313,265

(22) Filed: May 5, 2023

(65) Prior Publication Data

US 2024/0372607 A1 Nov. 7, 2024

(51) Int. Cl.
  *H04B 7/185* (2006.01)
  *H04W 74/08* (2024.01)

(52) U.S. Cl.
  CPC ..... *H04B 7/18519* (2013.01); *H04B 7/18517* (2013.01); *H04W 74/08* (2013.01)

(58) Field of Classification Search
  CPC ............ H04B 7/18513; H04B 7/18519; H04B 7/18517; H04W 74/08
  See application file for complete search history.

(56) References Cited

U.S. PATENT DOCUMENTS

| | | | | |
|---|---|---|---|---|
| 8,634,447 B2 * | 1/2014 | Diener | .................. | H04W 88/02 |
| | | | | 370/332 |
| 10,356,807 B2 * | 7/2019 | Yerramalli | ........ | H04W 72/1215 |
| 10,432,298 B2 * | 10/2019 | Xu | ..................... | H04B 7/18584 |
| 11,464,031 B2 * | 10/2022 | Garcia-Luna-Aceves | ................... | |
| | | | | H04W 72/535 |
| 11,785,501 B2 * | 10/2023 | Rao | ......................... | H04L 69/28 |
| | | | | 370/230 |
| 2013/0286830 A1 * | 10/2013 | Xu | ..................... | H04B 7/18584 |
| | | | | 370/232 |
| 2014/0199941 A1 * | 7/2014 | Walker | ............... | H04B 7/18539 |
| | | | | 455/12.1 |
| 2023/0050088 A1 * | 2/2023 | Wu | ........................ | H04W 24/08 |

FOREIGN PATENT DOCUMENTS

| | | |
|---|---|---|
| CN | 108696945 A | 10/2018 |

OTHER PUBLICATIONS

International Search Report and Written Opinion received for PCT Application No. PCT/US2024/025894, Sep. 9, 2024, 16 pages.
(Continued)

*Primary Examiner* — Bailor C Hsu
(74) *Attorney, Agent, or Firm* — Alleman Hall LLP

(57) ABSTRACT
A method for network data communication includes, at a terrestrial computing device, detecting one or more beacon signals from a corresponding one or more orbital communication satellites of a constellation of orbital communication satellites. A transmission probability threshold is adjusted based at least in part on a detected quantity of the one or more orbital communication satellites. Data is transmitted from the terrestrial computing device to the constellation of orbital communication satellites contingent on the transmission probability threshold being satisfied.

20 Claims, 8 Drawing Sheets

200

DETECT ONE OR MORE BEACON SIGNALS FROM A CORRESPONDING ONE OR MORE ORBITAL COMMUNICATION SATELLITES OF A CONSTELLATION
202

ADJUST A TRANSMISSION PROBABILITY THRESHOLD BASED AT LEAST IN PART ON A DETECTED QUANTITY OF THE ORBITAL COMMUNICATION SATELLITES
204

TRANSMIT DATA CONTINGENT ON THE TRANSMISSION PROBABILITY THRESHOLD BEING SATISFIED

RANDOMLY GENERATE A TRANSMISSION CHECK VALUE ON EACH OF A SERIES OF TIME STEPS
208
206

(56)           References Cited

OTHER PUBLICATIONS

Invitation To Pay Additional Fees received for PCT Application No. PCT/US2024/025894, Jul. 19, 2024, 09 pages.
Vogelgesang, et al., "Uplink Transmission Probability Functions for LoRa-Based Direct-to-Satellite IoT: A Case Study", 2021 IEEE Global Communications Conference (GLOBECOM), Dec. 7, 2021, pp. 1-6.

\* cited by examiner

200

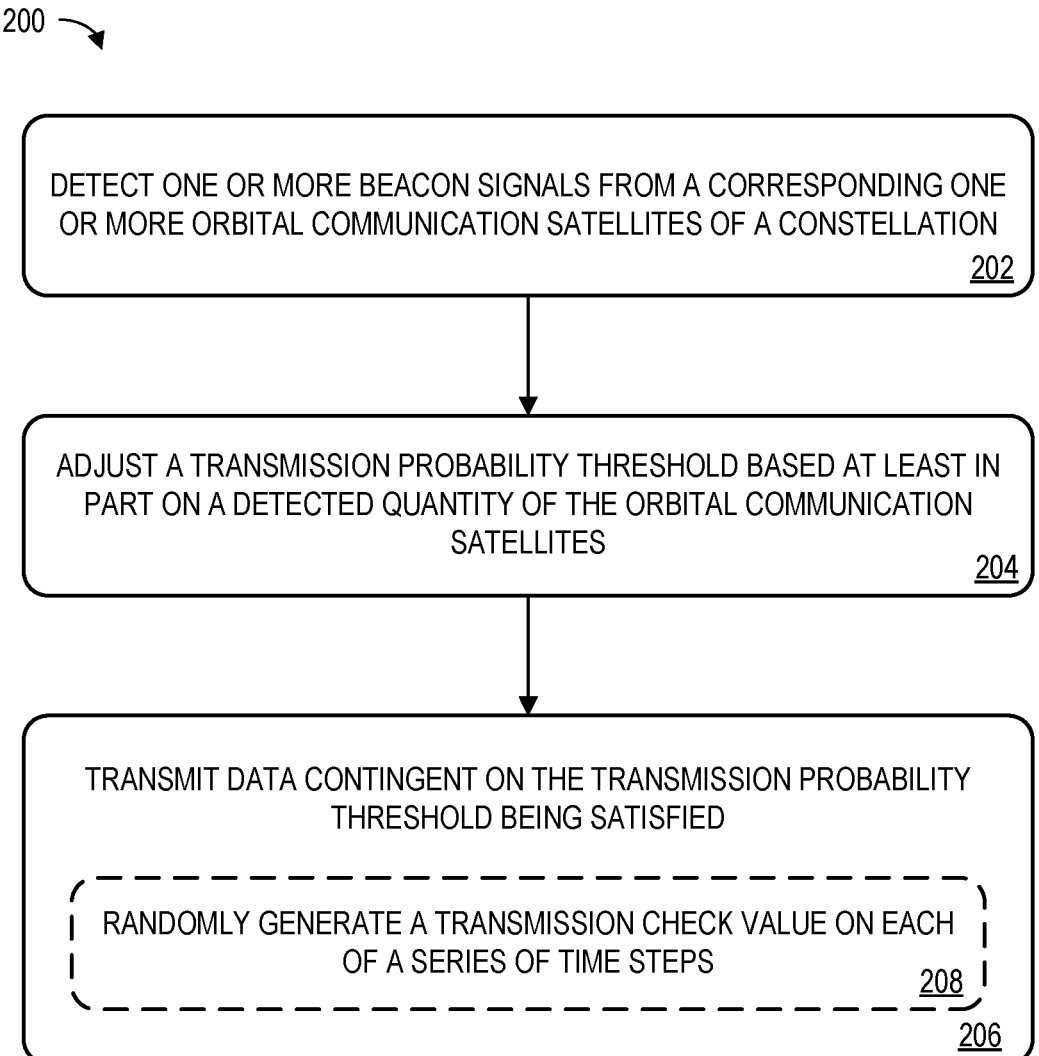

DETECT ONE OR MORE BEACON SIGNALS FROM A CORRESPONDING ONE OR MORE ORBITAL COMMUNICATION SATELLITES OF A CONSTELLATION
202

ADJUST A TRANSMISSION PROBABILITY THRESHOLD BASED AT LEAST IN PART ON A DETECTED QUANTITY OF THE ORBITAL COMMUNICATION SATELLITES
204

TRANSMIT DATA CONTINGENT ON THE TRANSMISSION PROBABILITY THRESHOLD BEING SATISFIED

RANDOMLY GENERATE A TRANSMISSION CHECK VALUE ON EACH OF A SERIES OF TIME STEPS
208

COMPUTING SYSTEM 500

LOGIC SUBSYSTEM 502

STORAGE SUBSYSTEM 504

DISPLAY SUBSYSTEM 506

INPUT SUBSYSTEM 508

COMMUNICATIONS INTERFACE 510

DATA TRAFFIC SCALING FOR COMMUNICATION SATELLITE

BACKGROUND

Use of communication satellites in Earth orbit has the potential to improve connectivity for terrestrial computing devices, including Internet-of-things (IoT) devices, even in remote geographic areas where terrestrial network infrastructure is lacking. Satellite-based communication networks are fundamentally different from terrestrial IoT networks, because device-satellite connectivity evolves over time as the satellites move, and because the satellites themselves may have lower capabilities (e.g., lower power, lower complexity hardware) than dedicated terrestrial network gateways.

SUMMARY

The present disclosure generally describes techniques for network data communication between a terrestrial computing device and an orbital communication satellite. Such communication is sometimes disrupted by network collisions—e.g., caused by two or more terrestrial computing devices transmitting at the same time. As such, according to the techniques described herein, the terrestrial computing device detects one or more beacon signals, which correspond to one or more orbital communication satellites providing coverage for the terrestrial computing device's location. Based on the quantity of the detected orbital communication satellites, the terrestrial computing device adjusts its transmission probability threshold—e.g., such that the transmission probability is reduced when relatively more satellites are detected. The terrestrial computing device transmits data to the orbital communication satellite contingent on the transmission probability threshold being satisfied.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 illustrates an example method for network data communication.

FIG. 4 schematically illustrates data exchange between a terrestrial computing device, orbital communication satellite, and network management device.

DETAILED DESCRIPTION

Figure 1A:
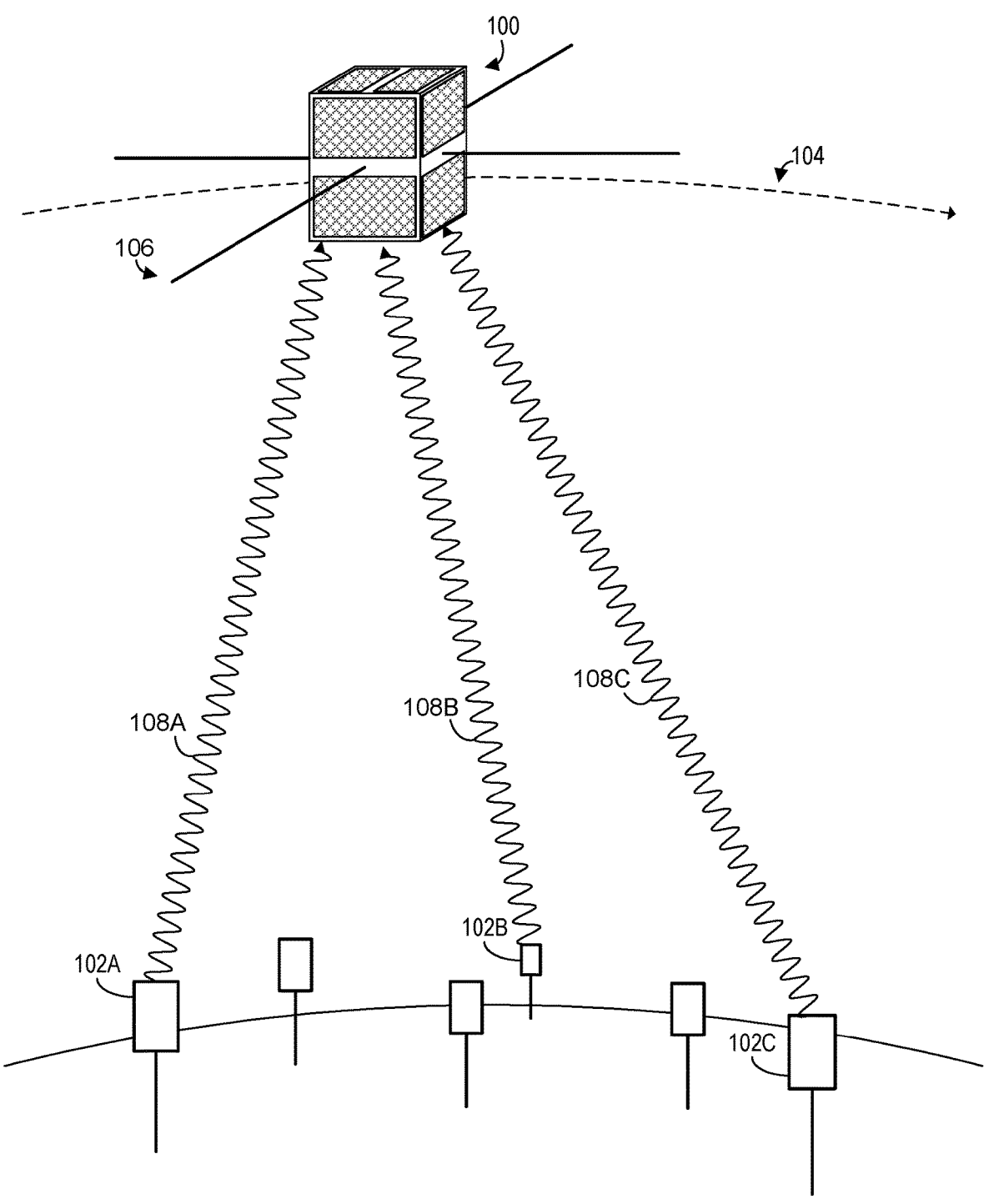
FIGS. 1A-1D schematically illustrate network data transmission between a plurality of terrestrial computing devices and orbital communication satellites.

As discussed above, satellite-based communication networks present various challenges as compared to terrestrial communication networks. For example, network throughput is negatively affected by network collisions, which are caused by multiple terrestrial devices attempting to transmit data to the same satellite at the same time. With, for instance, two terrestrial devices transmitting to the same satellite on the same channel concurrently, the orbital communication satellite may be unable to resolve data frames from either or both of the two terrestrial devices, resulting in loss of data.

As compared to terrestrial communication networks, computing devices transmitting data to orbital communication satellites may be unable to implement carrier sense-based medium access control. In other words, the devices may be unable to detect an ongoing transmission by another terrestrial device on the same channel, resulting in increasingly more network collisions as the volume of transmitted data increases. This is exacerbated because each satellite may provide coverage to a relatively large geographic "footprint"—e.g., on the order of millions of square kilometers. Given this, each satellite may simultaneously serve a relatively large number of terrestrial devices (e.g., thousands of unique devices). This significantly increases the risk that two different terrestrial devices in the satellite's coverage area will attempt to transmit at the same time, causing a network collision. Furthermore, the coverage footprints of multiple satellites can overlap, meaning transmission by any particular terrestrial device can potentially cause network collisions at multiple satellites.

Furthermore, terrestrial networks often rely on flow control to scale the volume of data transmission up or down—e.g., to reduce the transmission rate when collisions increase. For instance, a network gateway may transmit feedback in the form of acknowledgements that are useable by other network devices to alter their transmission rate. However, acknowledgments (e.g., per-packet or bulk) are often impractical in satellite-based communication networks because of the limited power available to the satellites, and because of the spectrum overhead of sending acknowledgments. This can be particularly burdensome when relatively low-cost and low-complexity satellites are used, as will be described in more detail below.

Accordingly, the present disclosure is directed to techniques for data communication in a satellite-based network setting, which includes a terrestrial computing device and a constellation of orbital communication satellites. Specifically, each terrestrial computing device adjusts its transmission probability threshold based on the quantity of orbital communication satellites that are currently in range to receive transmissions from the terrestrial computing device, thereby changing the probability that the terrestrial computing device transmits data on a next time step. In some examples, the threshold is changed such that the probability of data transmission decreases as the number of detected beacon signals increases. In other words, when transmission from the terrestrial computing device will be received by two or more satellites, the terrestrial computing device is less likely to transmit compared to when its transmission will be received by only one satellite.

In some embodiments, each orbital communication satellite transmits a beacon signal detectable by the terrestrial computing devices in that satellite's coverage footprint, and each terrestrial computing device detects one or more beacon signals from corresponding orbital communication satellites, where the detected number of beacon signals depends on whether that terrestrial device is currently in a coverage overlap between two or more satellites. In this way, each terrestrial computing device can assess whether it is in a coverage overlap and change its transmission probability accordingly. In other examples, the deterministic nature of each satellite's orbital motion can be used to create a schedule from which each terrestrial computing device can adjust its transmission probability.

This approach serves to temporarily reduce the transmission rate of any terrestrial computing devices currently located in the coverage overlap of two or more satellites, which provides the technical benefit of improving network performance by reducing the incidence of network collisions. Notably, because the satellites move relative to the surface of the Earth, the positions of the satellite coverage footprints change over time. As such, the population of devices having reduced transmission rates due to their presence in a satellite overlap zone is not static—e.g., the techniques described herein improve network performance without constantly penalizing the same subset of terrestrial computing devices.

Furthermore, according to the techniques described herein, the transmission probability threshold for each terrestrial computing device is in some cases adjusted based on a traffic scaling parameter received from the orbital communication satellite—e.g., as part of the beacon signal. In this manner, each orbital communication satellite can make ongoing adjustments to the data transmission rate for the terrestrial computing devices in that satellite's coverage footprint. This may be done, for instance, based on a quantity and/or trend of ongoing network collisions estimated by the orbital communication satellites—e.g., if the number of collisions measured is significantly larger than the amount expected from periodic traffic, the satellite can infer that devices in its footprint are generating higher amounts of data, and can include a 'backoff' instruction in its beacon signal. In some examples, the value of the traffic scaling parameter is itself set based at least in part on a rate control instruction transmitted to the satellite by a network management device—e.g., a remote cloud server that monitors network conditions on a constellation-wide level. This provides the technical benefit of improving network performance by reducing the incidence of network collisions, and is further implemented using specific mathematical relationships applied for a specific technical purpose (e.g., network collision mitigation in device-satellite data exchange).

FIGS. 1A-D schematically illustrate network communication between an orbital communication satellite 100 and a plurality of terrestrial computing devices, three of which are labeled as terrestrial computing devices 102A, 102B, and 102C. It will be understood that FIGS. 1A-D are highly simplified and provided only for the sake of explanation, and that components depicted in FIGS. 1A-D are not shown to scale.

In FIG. 1A, the plurality of terrestrial computing devices are located on Earth, while orbital communication satellite 100 is in an orbit 104. For example, satellite 100 may be located in low Earth orbit (LEO). The satellite may be included in a constellation of satellites, each of which may have the same or different capabilities from orbital communication satellite 100. It will be understood that a "constellation" of orbital communication satellites may include any plural number of individual satellites.

It will be understood that each of the orbital communication satellite, terrestrial computing devices, and any other computing devices described herein have any suitable capabilities, form factors, and hardware configurations. In some examples, the orbital communication satellite is implemented using relatively inexpensive, low-complexity, and low-power hardware, reducing the cost and size of each orbital communication satellite. In this manner, global satellite communication networks can be deployed and scaled relatively inexpensively—e.g., to the order of tens of thousands of satellites, often utilizing low Earth orbit (LEO) to reduce the transmission delay between the satellites and terrestrial devices. This beneficially provides network coverage to relatively remote geographic areas where terrestrial network infrastructure is lacking. For example, relatively large sets of Internet-of-Things (IoT) devices are in some cases used in such remote areas—e.g., to monitor soil conditions for farming, or detect forest fires. The techniques described herein beneficially reduce the effort required to provide network connectivity to such devices, for example, by alleviating the need to purchase and configure a terrestrial network gateway.

The present disclosure is primarily directed to implementations including such low-cost satellites, sometimes referred to as "picosats." Such satellites often include relatively simple data communication interfaces, such as omnidirectional antennas with no phased arrays. However, it will be understood that an "orbital communication satellite" as described herein has any suitable size, uses any suitable hardware, and has any suitable orbit relative to the Earth. In some examples, an orbital communication satellite as described herein is implemented as computing system 500 described below with respect to FIG. 5.

Similarly, the present disclosure generally focuses on scenarios where the terrestrial computing devices are relatively low-power IoT devices. Non-limiting examples of such IoT devices include sensors, such as thermometers, soil moisture sensors, pH sensors, light sensors, audio sensors, motion sensors, etc. However, it will be understood that a "terrestrial computing device" as described herein has any suitable capabilities. In some examples, a terrestrial computing device as described herein is implemented as computing system 500 described below with respect to FIG. 5.

In the example of FIG. 1A, orbital communication satellite 100 communicates with the terrestrial computing devices using an omnidirectional antenna 106. This is one non-limiting example of a suitable communications interface useable to send data to and/or receive data from a plurality of terrestrial computing devices. Specifically, in FIG. 1A, satellite 100 is receiving data transmitted by terrestrial computing devices 102A-C, represented as transmissions 108A-C depicted in FIG. 1A. Each terrestrial computing device itself may include any suitable hardware for transmitting data to, and/or receiving data from, an orbital communication satellite—e.g., each terrestrial computing device may also include an omnidirectional antenna. It will be understood that such transmissions can include virtually any suitable computer data, generated and transmitted for any suitable purpose.

Each individual transmission sent by a particular terrestrial computing device may include any suitable quantity of data, and transmissions may be sent at any suitable regular or irregular interval. As one non-limiting example, data transmission may use frequencies in the low range industrial, scientific, and medical (ISM) frequency band (100 MHz-1000 MHz), with relatively low data rates (e.g., on the order of single Kbps). Low frequency data communication can reduce the risk that the wireless links between terrestrial devices and satellites are significantly affected by weather and atmospheric conditions, unlike high frequency broadband satellites. Low frequencies also experience lower path loss, reducing the power requirement on the terrestrial computing devices and satellites. In some examples, the data is transmitted from the terrestrial computing devices to the constellation of orbital communication satellites using a randomized medium access protocol, such as slotted ALOHA, as one non-limiting example.

Similarly, as will be described in more detail below, the orbital communication satellite in some examples transmits data to the terrestrial computing devices—e.g., as a beacon signal. This can include virtually any suitable type and quantity of computer data, transmitted at any suitable regular or irregular interval. In some cases, the beacon signal (and/or any other data transmitted by the orbital communication satellite) is broadcast on a beacon communication channel, different from an uplink communication channel over which the data is received by the satellite from the plurality of terrestrial computing devices. This beneficially improves network performance by preventing uplink transmissions from interfering with beacon transmissions, and vice versa.

While the present disclosure describes data being transmitted from one device to another device (e.g., from a terrestrial computing device to one or more orbital communication satellites), it will be understood that this does not require that the data is transmitted to a specific device having a specific identifier or network address. Rather, as described herein, data transmission can include transmitting omnidirectionally on a particular channel (e.g., frequency), such that any other devices listening on that channel can receive the data. Thus, as used herein, a terrestrial computing device transmitting data to one or more orbital communication satellites may include transmitting data on a specific communications channel on which any orbital communication satellites currently in range can receive the data, without requiring the data to be addressed to any particular satellite.

Furthermore, the present disclosure primarily describes the terrestrial computing devices as transmitting directly to the orbital communication satellites—e.g., with no intermediary terrestrial network gateway. This is sometimes referred to as a direct-to-satellite (DtS) model. However, it will be understood that this is not limiting. Rather, in some examples, terrestrial network gateways are used as an intermediary between the terrestrial computing devices and orbital communication satellites. In either case, the data transmitted by the terrestrial computing device is received by one or more orbital communication satellites, regardless of whether the data is first relayed by a terrestrial network gateway.

As discussed above, orbital movement of the constellation of satellites means the position of each satellite's coverage footprint will change relative to the surface of the Earth. Thus, in cases where two or more coverage footprints create a coverage overlap region served by two or more different satellites at once, the position of the coverage overlap region will also change over time. This is schematically illustrated with respect to FIGS. 1B and 1C. Specifically, FIG. 1B again shows orbital communication satellite 100, along with a second orbital communication satellite 110, each orbiting above the service of the Earth 112. As with FIG. 1A, it will be understood that FIGS. 1B, 1C, and 1D are highly simplified, not shown to scale, and provided only for the sake of explanation.

Figure 1B:
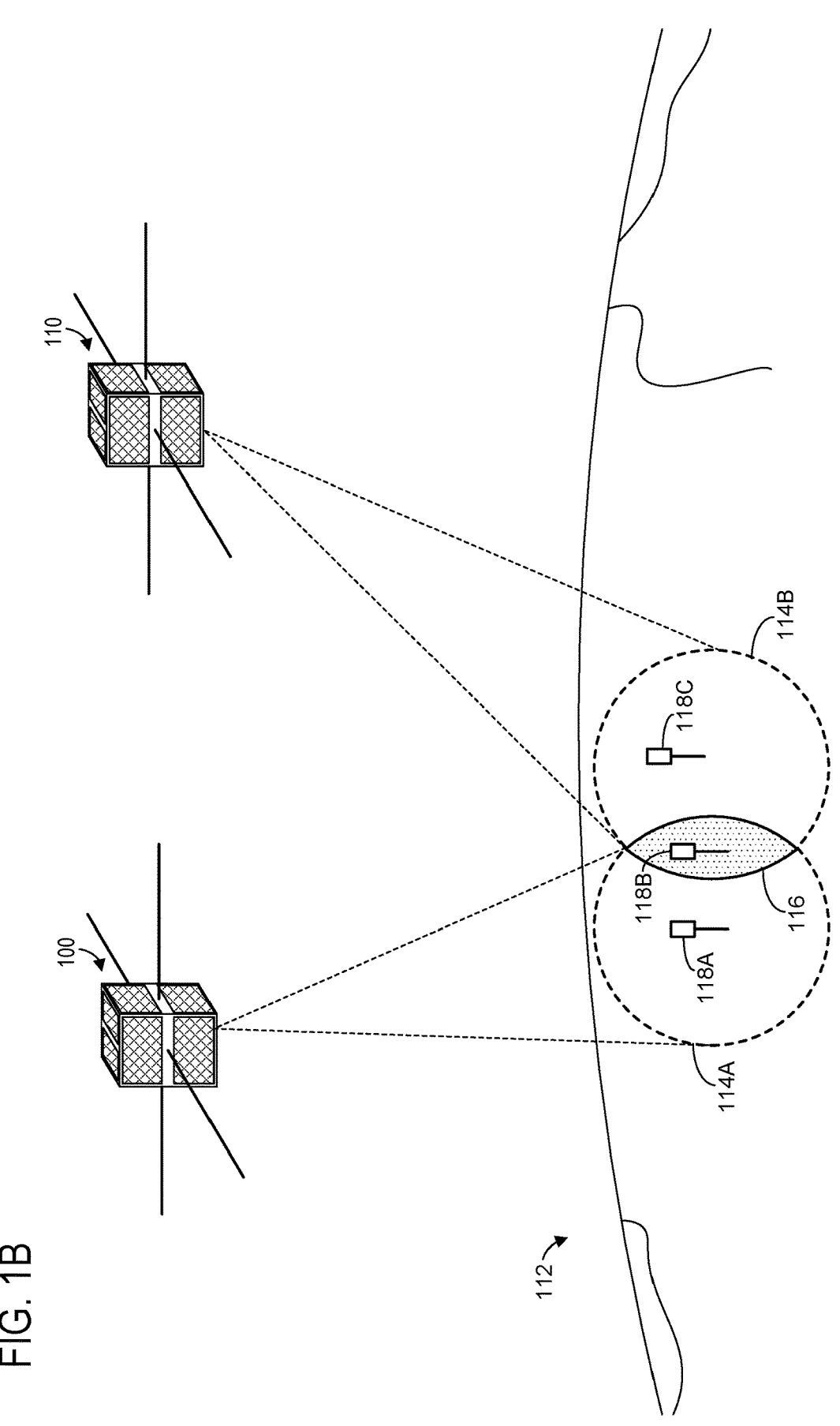
Figure 1C:
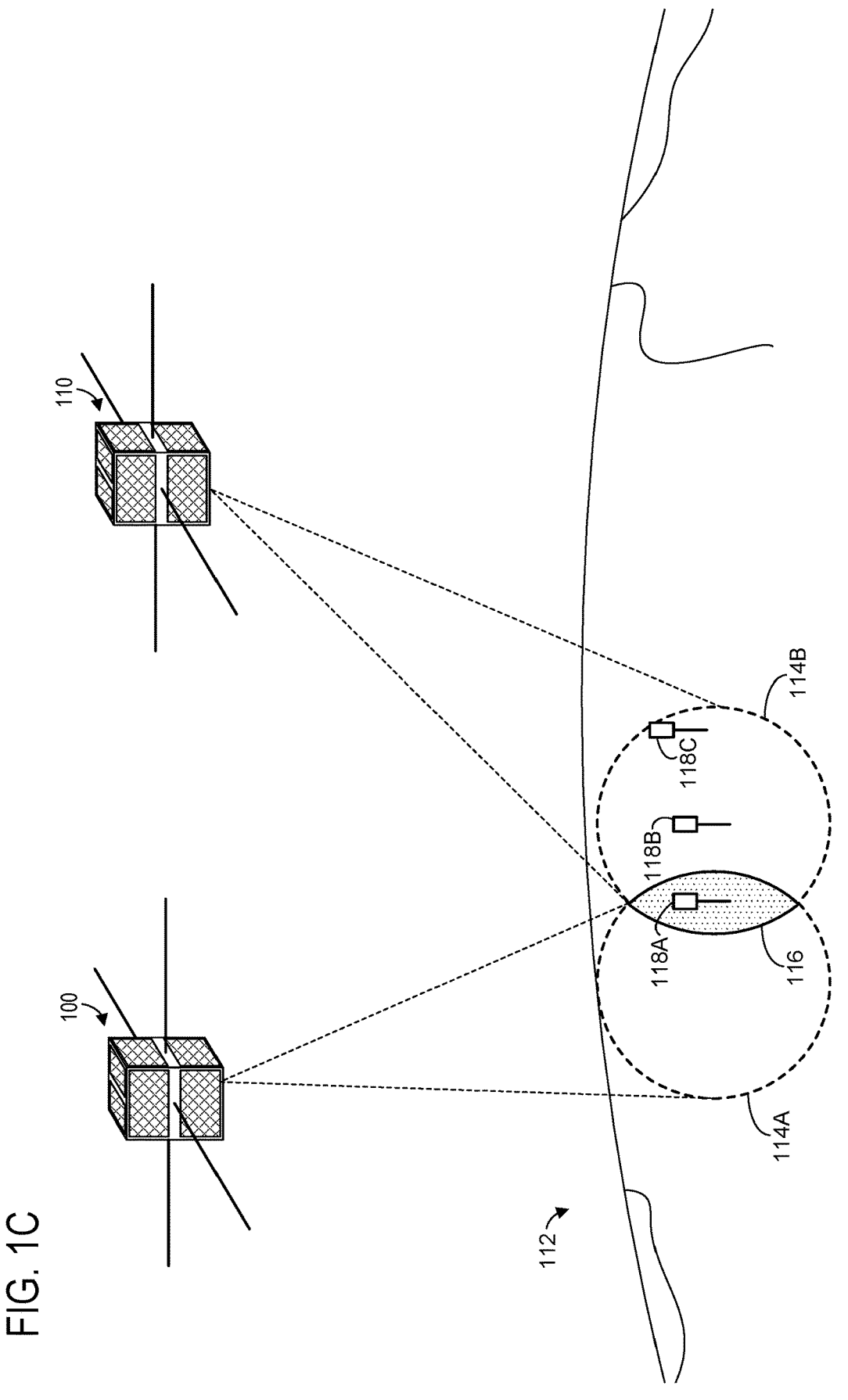
Figure 1D:
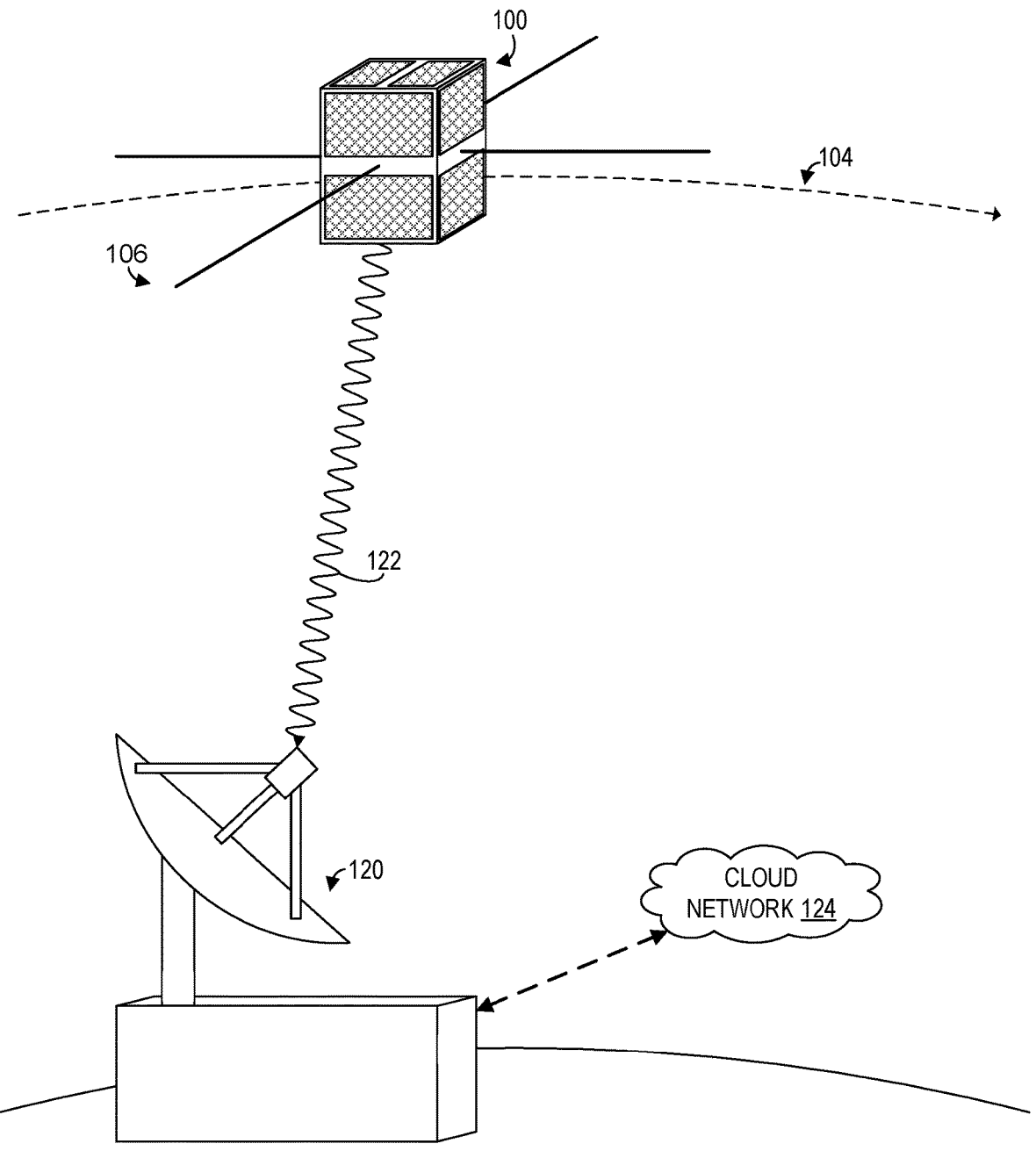

In FIG. 1B, each of satellites 100 and 110 has a corresponding coverage footprint 114A and 114B. The positions of three terrestrial computing devices 118A, 118B, and 118C are also shown. Terrestrial computing device 118A is located within coverage footprint 114A, terrestrial computing device 118C is located within coverage footprint 114B, and terrestrial computing device 118B is located within an overlap region 116 between coverage footprints 114A and 114B. In other words, data transmissions by terrestrial computing device 118B are detectable by both satellites 100 and 110, and can therefore potentially cause network collisions at both satellites. As such, as will be described in more detail below, the data transmission rate of terrestrial computing device 118B may be temporarily reduced—e.g., to reduce the incidence of network collisions.

However, due to the orbital motion of the satellites, the same terrestrial computing devices will not always be located in overlapping coverage zones—e.g., the population of devices having reduced transmission rates due to their presence in a satellite overlap zone is not static. This is schematically illustrated with respect to FIG. 1C, in which satellites 100 and 110 have moved relative to the Earth 112. This has caused a corresponding movement of coverage footprints 114A and 114B, along with coverage overlap region 116. In this example, terrestrial computing device 118B is no longer located within the coverage overlap, and thus its data transmission rate may be restored. Meanwhile, the data transmission rate of terrestrial computing device 118A may be reduced, as it is now located in the coverage overlap region.

In some examples, the data transmitted by the terrestrial computing devices is relayed by the orbital communication satellites for eventual delivery to a terrestrial computer network, such as the Internet or a private wide area network (WAN). For example, as will be described in more detail below, each orbital communication satellite may transmit any data received from the terrestrial computing devices to a ground network station—e.g., configured to receive the data and deliver it to a destination address. For example, the data transmitted by the terrestrial computing devices may be ultimately stored and/or processed in a cloud computing environment after the data is relayed by the satellite communication network.

This is schematically illustrated with respect to FIG. 1D. In this example, orbital communication satellite 100 is transmitting data to a ground network station 120 as transmission 122. In some examples, the data is transmitted to the ground network station over a downlink communication channel that is different from (e.g., using a different protocol and/or frequency band) the uplink communication channel over which the orbital communication satellites receive data from the terrestrial computing devices, and the beacon communication channel over which the satellites broadcast their beacon signals. The ground network station is implemented in any suitable way, using any suitable hardware for receiving data from, and/or transmitting data to, orbital communication satellites. In the example of FIG. 1D, the ground network station receives the data originating from the terrestrial computing devices, and provides such data to a cloud network 124. It will be understood that the extended satellite communication network may include any suitable number of different ground network stations, each having any suitable location relative to the Earth, and relative to the terrestrial computing devices transmitting data to the orbital communication satellites.

As will be described in more detail below, in some examples, the ground network station additionally receives network telemetry data from the constellation of orbital communication satellites. The telemetry may then be provided to a network management device configured to control the behavior of the constellation of orbital communication satellites based on the telemetry data. In some examples, the network management device is located at the ground station. Alternatively, in some examples, the network management device is located apart from the ground station and may be configured to receive the network telemetry data from the ground station, and/or one or more other ground stations, via a suitable wired or wireless connection. For example, the network management device may be implemented as one or more server computing devices located at a data center, where the network telemetry data is configured to be processed in a cloud computing environment. In some examples, the network management device is implemented as computing system 500 described below with respect to FIG. 5.

As described above, network collisions caused by multiple terrestrial computing devices transmitting at once can interfere with network throughput. As such, FIG. 2 illustrates an example method 200 for network data communication. Method 200 is described as being performed by a terrestrial computing device, such as an IoT device. However, in general, method 200 may be performed by any suitable computing system of one or more computing devices. Any computing device implementing steps of method 200 may have any suitable capabilities, hardware configuration, and form factor. Steps of method 200 may be initiated, terminated, and/or repeated at any suitable time and in response to any suitable trigger. In some examples, method 200 is performed by computing system 500 described below with respect to FIG. 5.

Figure 3:
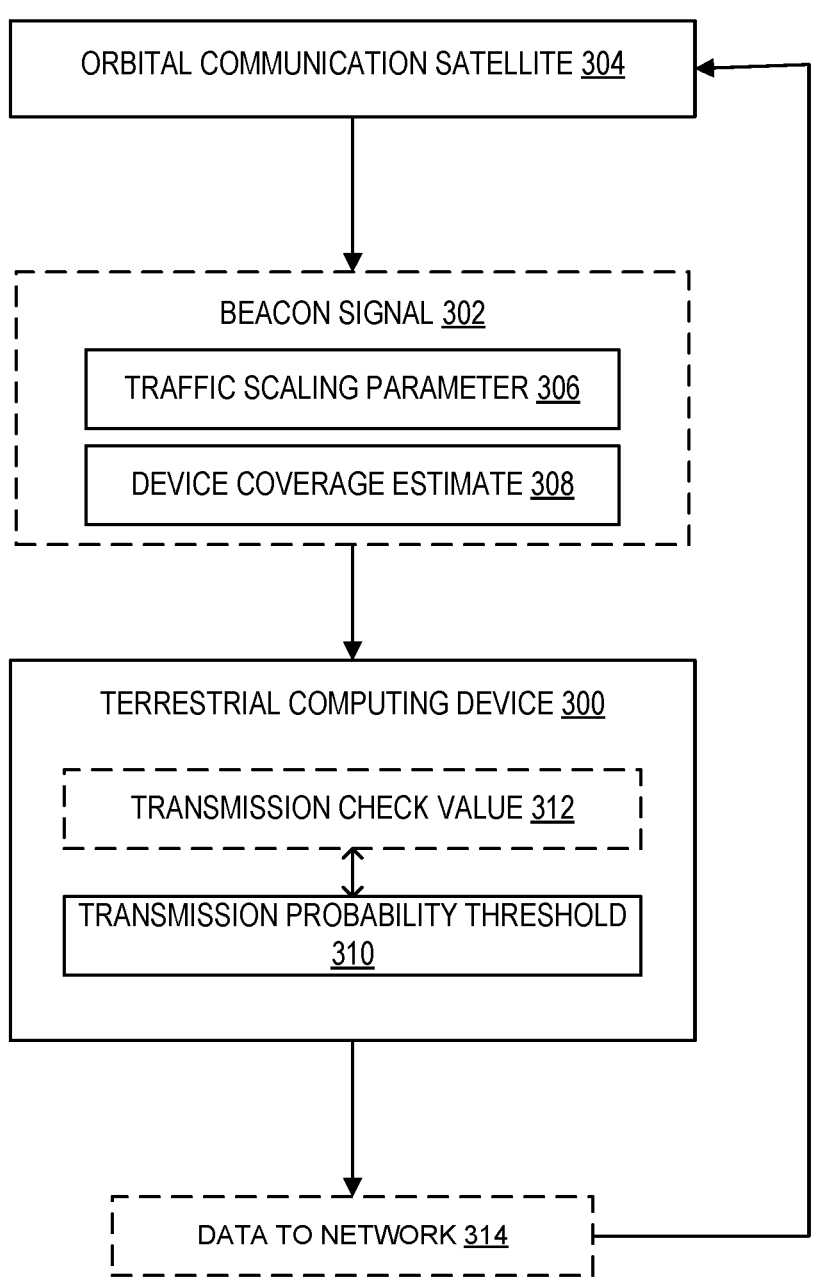
FIG. 3 schematically illustrates data exchange between a terrestrial computing device and an orbital communication satellite.

At 202, method 200 includes detecting one or more beacon signals from a corresponding one or more orbital communication satellites of a constellation of orbital communication satellites. This is schematically illustrated with respect to FIG. 3, showing a terrestrial computing device 300 receiving a beacon signal 302 from an orbital communication satellite 304, which is one of a constellation of satellites. As discussed above, in some examples, the coverage footprints of two or more satellites may overlap. As such, at any given time, a terrestrial computing device may detect multiple different beacon signals corresponding to multiple different satellites.

A beacon signal may include any suitable data useable by the terrestrial computing device to adjust its data transmission rate. Furthermore, it will be understood that each orbital communication satellite transmits a beacon signal at any suitable regular or irregular time interval. In some examples, different satellites use different time intervals.

As one example, each beacon signal may include a traffic scaling parameter, such as traffic scaling parameter 306 shown in FIG. 3. As will be described in more detail below, the value of the traffic scaling parameter may be set by an orbital communication satellite, and useable by the terrestrial computing devices in that satellite's footprint to change their respective transmission rates—e.g., the transmission rate may be decreased when more network collisions are observed.

Additionally, or alternatively, each beacon signal may include a device coverage estimate generated by the corresponding orbital communication satellite providing the beacon signal, such as device coverage estimate 308 shown in FIG. 3. A device coverage estimate indicates an estimated number of terrestrial computing devices currently served by the corresponding orbital communication satellite. As will be described in more detail below, the device coverage estimate is in some cases used by the terrestrial computing device in calculating a transmission probability estimate. Additionally, or alternatively, the beacon signal may include other suitable data, such as the satellite's position, the satellite's health status, a unique identifier for the satellite, etc.

Returning briefly to FIG. 2, at 204, method 200 includes adjusting a transmission probability threshold based at least in part on a detected quantity of the one or more orbital communication satellites. This is schematically illustrated with respect to FIG. 3, in which terrestrial computing device 300 sets a transmission probability threshold 310 based at least in part on information included in the received beacon signal 302.

As discussed above, in some examples, the transmission probability threshold is adjusted such that a probability of data transmission on a current time step is inversely related (e.g., inversely proportional) to the detected quantity of the one or more orbital communication satellites. In other words, when the number of detected satellites is relatively higher, the probability of data being transmitted on any given time step is relatively lower. Because terrestrial computing devices located in the overlapping coverage footprints of two or more satellites are relatively more likely to cause network collisions at a greater number of satellites, temporarily reducing the collision rate of such devices beneficially improves the data throughput for the network as a whole.

The transmission probability threshold is calculated in any suitable way, based on any or all data available to the terrestrial computing device, including data transmitted by orbital communication satellites via the one or more beacon signals. For instance, in some examples, the transmission probability threshold is based at least in part on a traffic scaling parameter. As will be described in more detail below, an orbital communication satellite in some cases sets the value of the traffic scaling parameter to achieve ongoing control over the data transmission rate of the terrestrial computing devices in that satellite's coverage footprint.

One non-limiting example of a specific approach for calculating the transmission probability threshold will now be provided. In this example, the transmission probability threshold ($P_D$) is calculated based in part on a traffic scaling parameter ($\alpha$), a device coverage estimated received via the beacon signal ($Nsat_i$), and the detected quantity of the one or more orbital communication satellites (K), given by the number of beacon signals recently detected by the terrestrial computing device:

$$p_d = \alpha \frac{1}{\sum_{i=1}^{k} |Nsat_i|}$$

Returning briefly to FIG. 2, at 206, method 200 includes transmitting data from the terrestrial computing device to the constellation of orbital communication satellites contingent on the transmission probability threshold being satisfied. As one non-limiting example, a randomly generated transmission check value is compared to the transmission probability threshold to determine whether the threshold is satisfied. As such, method 200 optionally includes, at 208, randomly generating a transmission check value on each of a series of time steps. Each randomly generated transmission check value may then be compared to the current transmission probability threshold to determine if the threshold is satisfied, and thereby determine whether the terrestrial computing device should transmit data to the orbital communication satellites on that (and/or a later) time step. It will be understood that a single "time step" may refer to any suitable length of time—e.g., a time step may be on the order of microseconds, milliseconds, single seconds, or any other suitable length.

In the example of FIG. 3, terrestrial computing device 300 compares the transmission probability threshold to a transmission check value 312. Contingent on the transmission probability threshold being satisfied, the terrestrial computing device transmits data 314 for reception by any satellites in range. The satellites may then transmit the data to a ground network station for delivery over the Internet, or another suitable terrestrial network.

It will be understood that both the transmission probability threshold, and the transmission check value, take any suitable form depending on the implementation. In some examples, the transmission probability threshold is satisfied when the check value is higher than the threshold. In such cases, an increase in the transmission probability threshold causes a decrease in the probability of transmission occurring. However, it will be understood that, in some examples, the opposite may be true. In other words, transmission only occurs if the transmission check value is below the transmission probability threshold. Thus, lowering the probability threshold would result in a lower probability of transmission.

In any case, upon determining that the transmission probability threshold is satisfied on any given time step, the terrestrial computing device transmits data to the constellation of orbital communication satellites. As discussed above, this is done in any suitable way (e.g., using any suitable communication hardware of the terrestrial computing device), and need not include transmitting data to any specific satellite in particular—e.g., rather, data may be broadcast on a data channel for receipt by any satellites currently in range. In some examples, the data is transmitted from the terrestrial computing device to the constellation of orbital communication satellites on an uplink communication channel, different from a beacon communication channel over which the one or more beacon signals are detected, and different from a downlink channel over which the satellites transmit data to the ground network station(s). This beneficially prevents outgoing data transmissions from interfering with incoming beacon signals.

As discussed above, the data transmission rate of a terrestrial computing device is in some cases influenced by data transmitted by an orbital communication satellite—e.g., including a traffic scaling parameter. In some examples, the satellites themselves may receive traffic control instructions from a network management device—e.g., based on telemetry data provided by the satellites. In this manner, transmission rate control on a constellation-wide level can be achieved, and adjusted relatively quickly as network conditions change.

Figure 4:
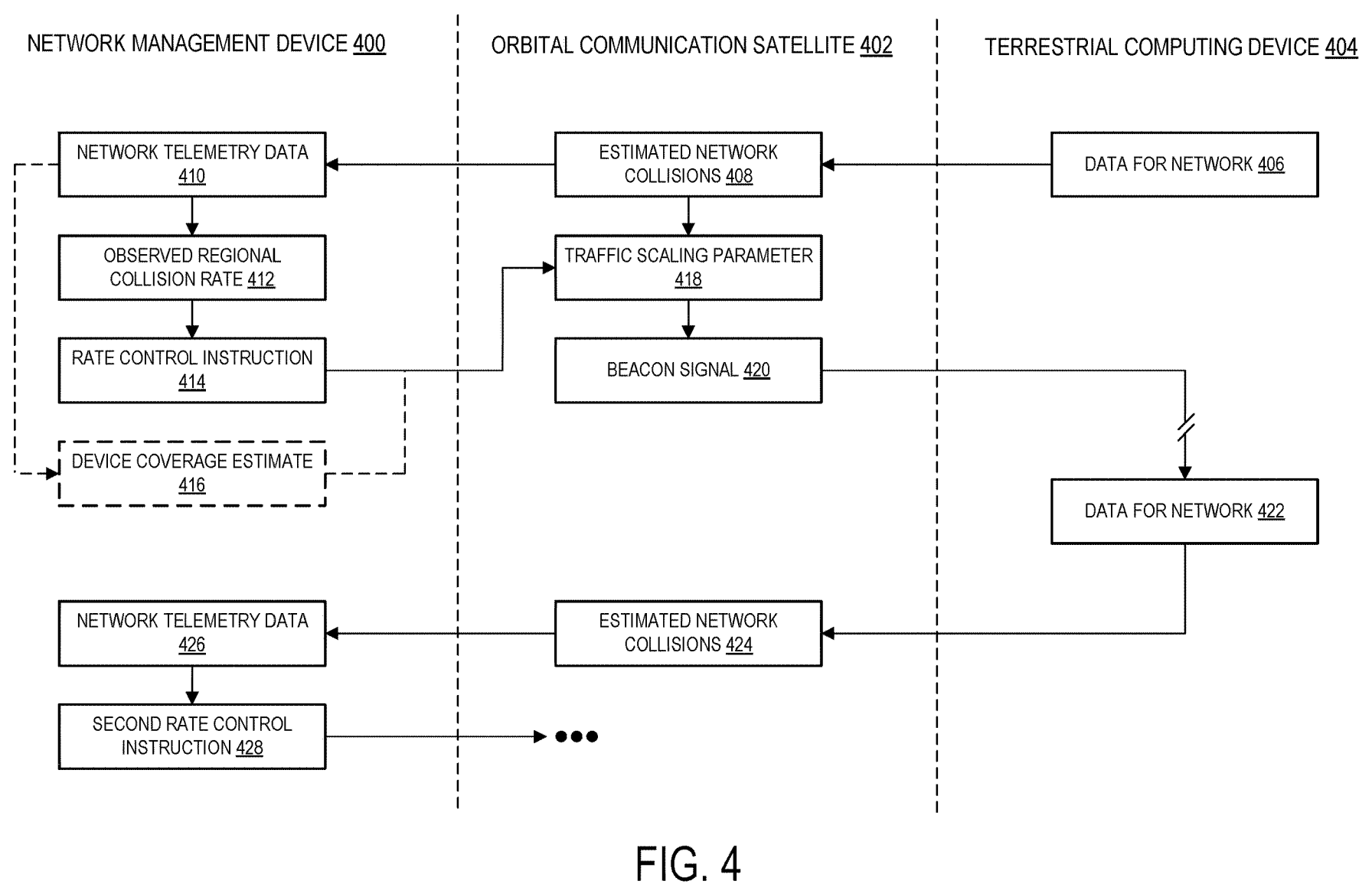

FIG. 4 schematically illustrates exchange of data between a network management device 400, an orbital communication satellite 402, and a terrestrial computing device 404. Each of these devices may be implemented as described above with respect to FIGS. 1A and 1B. Furthermore, it will be understood that the specific data flow shown in FIG. 4 is simplified and presented only as a non-limiting example. In general, any of a wide variety of suitable types of data may be exchanged between terrestrial computing devices, orbital communication satellites, and network management services.

As shown, orbital communication satellite 402 receives data 406 from the terrestrial computing device transmitted as described above—e.g., in response to a transmission probability threshold being satisfied. In some examples, the orbital communication satellite receives data from a plurality of different terrestrial computing devices as it orbits the Earth. Though not shown in FIG. 4, the data received from the terrestrial computing devices is in some examples delivered to one or more ground network stations for eventual delivery to a destination device in a terrestrial computer network—e.g., the Internet.

In some examples, each orbital communication satellite is configured to estimate the number of network collisions occurring during reception of the data transmitted by the terrestrial computing devices. For example, an estimated number of network collisions may be calculated on each of a series of time intervals, where a single interval has any suitable length—e.g., on the order of seconds or minutes. In the example of FIG. 4, the orbital communication satellite generates an estimated number of network collisions 408 based at least in part on the received data 406.

The number of network collisions is estimated in any suitable way. As one non-limiting example, the number of network collisions may be estimated using a Channel Activity Detection (CAD) service of a LoRa networking protocol, which beneficially can enable detection of network collisions below the noise floor. In one example approach, CAD detects the presence of LoRa symbols on a channel with minimal power consumption, even when the complete LoRa packet cannot be decoded. In some examples, relatively short CAD cycles (e.g., of four LoRa symbols length) are run at regular intervals. The interval may be set such that multiple CAD cycles can be conducted even within the shortest expected LoRa packet time. By observing positive CAD results but a lack of valid packet reception, the number of network collision events can be estimated. Additionally, or alternatively, a similar approach may in some examples be used to observe unusually long channel inactivity—e.g., indicative of a relatively low data transmission rate by the terrestrial computing devices.

Once estimated, the number of network collisions occurring over any given time interval is in some cases transmitted to the network management device for analysis. For instance, in some examples, each of the orbital communication satellites report network telemetry data to the network management device, where such telemetry data may include the estimated number of network collisions, and/or may include data useable to derive the estimated number of network collisions. In other words, in some examples, the telemetry data received by the network management device is aggregated from the plurality of orbital communication satellites, and is indicative of an estimated number of network collisions occurring over a time interval. In the example of FIG. 4, network management device receives network telemetry data 410, which includes the estimated number of network collisions 408.

As discussed above, any data transmitted by the orbital communication satellites to the network management device may first be transmitted to one or more different ground network stations, which are configured to receive data from the orbital communication satellites, and deliver such data over a terrestrial network. For example, the network ground stations may receive the network telemetry from the orbital communication satellites, and deliver such network telemetry to the network management device. In some examples, the network ground stations are additionally configured to transmit data to the orbital communication satellites—e.g., data originating from the network management device.

In some examples, upon receiving the network telemetry data, the network management device calculates an observed regional collision rate for a geographical region of interest based at least in part on the network telemetry data. In other words, in contrast to the estimated number of network collisions estimated by the orbital communications satellite, the observed regional collision rate is an estimate of the typical transmission rate for a particular region—e.g., as determined based on data reported by multiple satellites. In the example of FIG. 4, network management device 400 calculates an observed regional collision rate 412. This is done in any suitable way. As one non-limiting example, the observed regional collision rate is calculated by averaging the observed network collisions for any orbital communication satellites providing coverage to the geographical region of interest over a particular window of time—e.g., on the order of hours or days.

It will be understood that the geographical region of interest has any suitable size and can include any arbitrary portion of the total coverage area for the communication network—e.g., a geographical region of interest can include any suitable portion of the surface of the Earth. Any suitable number of geographical regions of interest may be maintained. In some examples, substantially the entire surface of the Earth is divided into different geographical regions of interest. In some examples, the shapes, sizes, borders, and/or positions of geographical regions of interest are changeable by the network management device over time. Furthermore, different regional collision rates are in some cases calculated for each different geographical region of interest.

Regardless, upon calculating the observed regional collision rate for a region of interest, the network management device in some cases generates a rate control instruction useable to adjust the transmission rate for the region of interest. In other words, the rate control instruction is useable by any or all orbital communication satellites providing coverage to the region of interest to adjust the data transmission rate of any terrestrial computing devices transmitting from the region of interest. In the example of FIG. 4, the network management device generates a rate control instruction 414.

As one non-limiting example, the rate control instruction is, or includes, the observed regional collision rate, and/or includes information useable to derive the observed regional collision rate. In some examples, the rate control instruction takes the form of a traffic scaling parameter as described above. Additionally, or alternatively, the rate control instruction may include an explicit command to attempt to increase or decrease the transmission rate for terrestrial computing devices located in the geographical region of interest. For instance, the rate control instruction may be implemented as a weighting factor that serves to increase or decrease a traffic scaling parameter calculated by an orbital communication satellite.

For instance, as will be described in more detail below, the network management device may in some cases determine that a current collision rate for a particular region of interest, as reported by a satellite, differs significantly from a prior observed regional collision rate. On this basis, the network management device in some cases determines that a localized event (e.g., a forest fire) is affecting the transmission rate for the region of interest. Thus, the rate control instruction may include an explicit command to increase or decrease the data transmission rate—e.g., the rate may be reduced to mitigate network collisions.

Regardless, upon generating the rate control instruction, the network management device in some cases transmits the rate control instruction to a selected orbital communication satellite that is scheduled to provide coverage for the geographical region of interest. For example, the selected satellite may be scheduled to pass over the region of interest on its next orbit. The rate control instruction is transmitted to the satellite in any suitable way—e.g., it may be transmitted over a terrestrial network to a ground network station, and then transmitted by the ground network station to the orbital communication satellite. In the example of FIG. 4, the rate control instruction 414 is transmitted to the orbital communication satellite 402.

Additionally, in FIG. 4, the network management device generates a device coverage estimate 416, which is also transmitted to the orbital communication satellite along with the rate control instruction. In some examples, the device coverage estimate is an estimate of the number of terrestrial computing devices that currently are, and/or soon will, receive coverage from a particular orbital communication satellite. For example, the device coverage estimate for a particular satellite may be transmitted to the satellite from the network management device, and then broadcast by that satellite as part of its beacon signal, as described above (e.g., device coverage estimate 308 of FIG. 3). Additionally, or alternatively, a device coverage estimate may be an estimate of the number of terrestrial computing devices included in a geographical region of interest. As such, the network management device may, in some examples, generate device coverage estimates for any or all of the orbital communication satellites of the constellation, and/or any or all of the geographical regions of interest it has defined relative to the surface of the Earth. Such device coverage estimates may be generated, updated, and/or transmitted at any suitable time and at any suitable regular or irregular interval.

A device coverage estimate may be generated in any suitable way. In some examples, the orbital communication satellites report data to the network management device indicative of the total number of unique terrestrial computing devices that transmitted to that satellite over a period of time—e.g., one orbit. By aggregating data from the constellation of satellites over several orbits, the network management device may approximate the geographic distribution of terrestrial computing devices that interface with the satellite communication network. From there, the network management device may estimate the number of unique terrestrial computing devices in any particular geographic region of interest, and estimate how many terrestrial computing devices are served by any particular satellite based on that satellite's position.

Regardless, returning to FIG. 4, the orbital communication satellite sets the value of a traffic scaling parameter 418. This is done based at least in part on the estimated number of network collisions 408. In some examples, the traffic scaling parameter is generated based at least in part on one or both of a rate control instruction (e.g., instruction 414) and a device coverage estimate (e.g., estimate 416) provided by a network management device. In some examples, as described above, the rate control instruction is or includes the traffic scaling parameter—e.g., in other words, the traffic scaling parameter is generated by the network management device rather than by the orbital communication satellite.

In either case, the traffic scaling parameter takes any suitable form and is generated in any suitable way, provided that it is useable by terrestrial computing devices to adjust their data transmission rate. In some examples, the traffic scaling parameter beneficially supports a multiplicative decrease, additive-increase strategy to ensure fairness among devices, with the multiplicative factor and additive increase value chosen empirically.

Regardless, the orbital communication satellite, and/or network management device, adjust the value of the traffic scaling parameter ($\alpha$) over time in response to changing network collisions. In general, the flow control decisions are two-fold: if the fraction of colliding packets is too high, then reduce $\alpha$. If the channel is idle for a significant fraction of time, increase α. In some examples, this includes comparing the estimated number of network collisions (e.g., estimated collisions 408) to an expected number of network collisions. In some examples, the expected number of network collisions is calculated by the orbital communication satellite. Additionally, or alternatively, the estimated number of network collisions may be compared to an observed regional collision rate generated by the network management device based on data aggregated from a plurality of satellites (e.g., observed regional rate 412). In other words, in various examples, the expected number of network collisions is either calculated by the orbital communication satellite (as will be described below), and/or received from the network management device (e.g., as an observed regional collision rate).

One non-limiting example of a specific approach by which a satellite (and/or other suitable device) may calculate an expected number of network collisions will now be provided. In this example, the number of terrestrial computing devices currently within a satellite's coverage footprint is referred to as M. The expected number of collisions depends on 1) the amount of data that these devices have generated and 2) the number of devices transmitting data. For every device d, the data generation of each device may be modeled as $D \sim \text{poisson}(\lambda)$, where $\lambda$ is the data generation rate of typical traffic on the network. The estimated probability of a device transmission may be calculated as the product of the probability of a device having data and its fair-share probability:

$$\left( p' = 1/M \right): P_{dTx} = P\left( D \geq 1 \right) * p'$$

From there, the binomial $P_{Tx} = \text{Bin}(P_{dTx}, M)$ approximates the expected number of transmissions in a given interval of time. The probability of expected collision, $P_{EC}$, is:

$$P_{EC} = 1 - P_{Tx}(T_x = 1) - P_{Tx}(T_x = 0)$$

Once calculated, this may be used to adjust the traffic scaling parameter. For example, responsive to determining that the estimated number of collisions exceeds the estimated number of collisions, the traffic scaling parameter may be adjusted such that it causes a decrease in traffic transmitted by the plurality of terrestrial computing devices. Similarly, the traffic scaling parameter may cause an increase in traffic if the observed collision rate is lower than expected—e.g., indicating that the transmission rate is currently too conservative.

In addition to, or instead of, calculating an expected number of network collisions, an observed channel inactivity is in some examples compared to a channel inactivity threshold in determining how to adjust the traffic scaling parameter. In one non-limiting approach, the channel inactivity threshold ($\tau_{EI}$), is based on the probability of unoccupied uplink slots on a satellite ($P_{Tx}$ ($T_x$=0)). For example, responsive to determining that the observed channel inactivity exceeds the channel inactivity threshold, the traffic scaling parameter may be adjusted such that it increases the traffic transmitted by the plurality of terrestrial computing devices.

In some examples, the value of the traffic scaling parameter is set based at least in part on a rate control instruction received from a network management device. For example, as described above, the rate control instruction in some cases is the traffic scaling parameter. For instance, the traffic scaling parameter may be generated by the network management device instead of the satellite, or a traffic scaling parameter generated by the network management device may supersede a different traffic scaling parameter generated by the satellite. In other examples, the rate control instruction is a weighting factor that changes the value (e.g., increases or decreases) of the traffic scaling parameter generated by the orbital communication satellite.

In some examples, in addition to or instead of changing the traffic scaling parameter by comparing the estimated number of network collisions to an expected number, the traffic scaling parameter is adjusted based on a trend of network collisions over time. As one example, a flat or increasing trend of collisions that exceeds the expected number of collisions may be indicative of the satellite entering a high traffic region or experiencing a new burst of traffic. As such, the traffic scaling parameter may be reduced.

In another example, in the event of a declining trend in collisions, the satellite initially makes no change to the traffic scaling parameter, even if the current estimated number of network collisions exceeds the expected number. This scenario could indicate that the satellite is moving away from a heavily traffic congested area, or that a burst of traffic has subsided. However, if the network management device determines from the network telemetry data that the satellites providing coverage to a particular region are consistently reporting high network collisions, then the network management device may generate and transmit a rate control instruction that causes a reduction in the transmission rate for that region—e.g., the satellite responds to the rate control instruction by reducing the traffic scaling parameter.

As another example, a flat or declining trend in channel inactivity below $\tau_{EI}$ may indicate two scenarios: the devices may have no data to transmit, and/or the devices may be restricted by a decrease in transmission rate implemented previously by another satellite. In such examples, the satellite may respond by increasing the traffic scaling parameter, thereby enabling the terrestrial devices to transmit data more frequently, provided they have data to transmit.

Returning to FIG. 4, once the traffic scaling parameter is adjusted, then the orbital communication satellite transmits a beacon signal 420 to the terrestrial computing device as described above (e.g., beacon signal 420 may be substantially similar to beacon signal 302 described with respect to FIG. 3). In the example of FIG. 4, the beacon signal includes the traffic scaling parameter 418. In some examples, the beacon signal additionally or alternatively includes a device coverage estimate received from a network management device (e.g., estimate 416).

In any case, upon detecting the beacon signal, the terrestrial computing device adjusts its data transmission rate as described above. The terrestrial computing device may then transmit a next set of data 422 to the orbital communication satellite at a later time, causing all or part of the process described above to repeat. For example, in FIG. 4, the orbital communication satellite estimates an updated number of network collisions 424, which is transmitted to the network management device as part of updated network telemetry 426. The network management device then transmits an updated rate control instruction 428—e.g., based on a change in the number of network collisions observed by the orbital communication satellite.

For example, in one scenario, a selected orbital communication satellite providing coverage for a geographical region of interest reports an estimated number of network collisions over a second time interval, occurring after the network management device has generated an observed regional collision rate for the region of interest as described above. Upon determining that the number of network collisions estimated to have occurred over the second time interval exceeds the observed regional collision rate calculated previously by the network management device, the network management device may transmit an updated rate control instruction to the selected orbital communication satellite that is useable by the satellite to reduce the data transmission rate of the plurality of terrestrial computing devices in that satellite's coverage footprint. This may occur when, for example, a localized event has caused a sudden increase in the data transmission rate in a particular area— e.g., a forest fire, earthquake, flood, or other natural incident is generating a relatively large volume of data for the terrestrial computing devices to report.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 5:
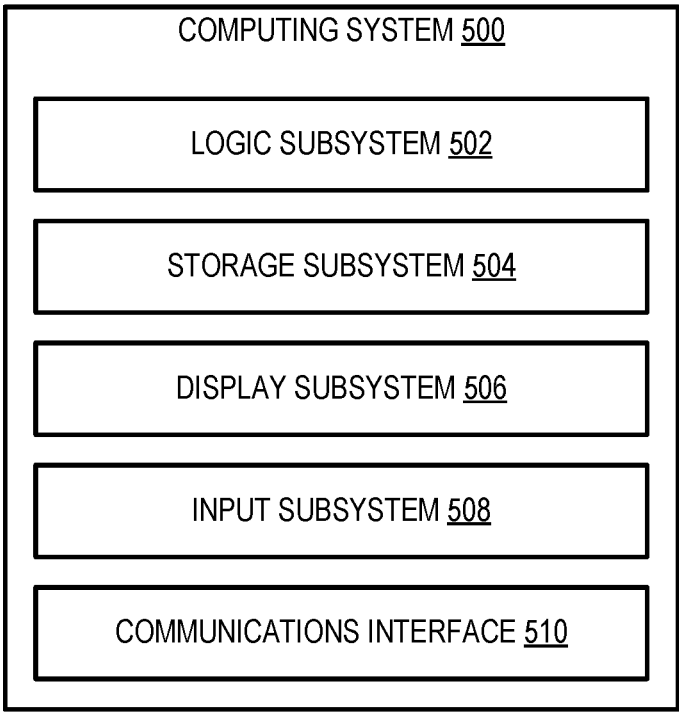
FIG. 5 schematically shows an example computing system.

FIG. 5 schematically shows a simplified representation of a computing system 500 configured to provide any to all of the compute functionality described herein. Computing system 500 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 500 includes a logic subsystem 502 and a storage subsystem 504. Computing system 500 may optionally include a display subsystem 506, input subsystem 508, communication subsystem 510, and/or other subsystems not shown in FIG. 5.

Logic subsystem 502 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 504 includes one or more physical devices configured to temporarily and/or permanently hold computer information such as data and instructions executable by the logic subsystem. When the storage subsystem includes two or more devices, the devices may be collocated and/or remotely located. Storage subsystem 504 may include volatile, nonvolatile, dynamic, static, read/write, read-only, random-access, sequential-access, location-addressable, file-addressable, and/or content-addressable devices. Storage subsystem 504 may include removable and/or built-in devices. When the logic subsystem executes instructions, the state of storage subsystem 504 may be transformed—e.g., to hold different data.

Aspects of logic subsystem 502 and storage subsystem 504 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

When included, display subsystem 506 may be used to present a visual representation of data held by storage subsystem 504. This visual representation may take the form of a graphical user interface (GUI). Display subsystem 506 may include one or more display devices utilizing virtually any type of technology. In some implementations, display subsystem may include one or more virtual-, augmented-, or mixed reality displays.

When included, input subsystem 508 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 510 may be configured to communicatively couple computing system 500 with one or more other computing devices. Communication subsystem 510 may include wired and/or wireless communication devices compatible with one or more different communication protocols. The communication subsystem may be configured for communication via personal-, local- and/or wide-area networks.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a method for network data communication comprises: at a terrestrial computing device, detecting one or more beacon signals from a corresponding one or more orbital communication satellites of a constellation of orbital communication satellites; adjusting a transmission probability threshold based at least in part on a detected quantity of the one or more orbital communication satellites; and transmitting data from the terrestrial computing device to the constellation of orbital communication satellites contingent on the transmission probability threshold being satisfied. In this example or any other example, the transmission probability threshold is adjusted such that a probability of data transmission on a current time step is inversely related to the detected quantity of the one or more orbital communication satellites. In this example or any other example, the one or more beacon signals each include a traffic scaling parameter, and wherein the transmission probability threshold is further adjusted based at least in part on the traffic scaling parameter. In this example or any other example, the method further comprises, on each of a series of time steps, randomly generating a transmission check value, and wherein the data is transmitted from the terrestrial computing device to the constellation of orbital communication satellites contingent on the transmission check value satisfying the transmission probability threshold. In this example or any other example, each of the one or more beacon signals includes a device coverage estimate generated by a corresponding orbital communication satellite of the one or more orbital communication satellites, each device coverage estimate indicating an estimated number of terrestrial computing devices currently served by the corresponding orbital communication satellite. In this example or any other example, the device coverage estimate is $Nsat_i$, the detected quantity of the one or more orbital communication satellites is K, a traffic scaling parameter is $\alpha$, the transmission probability threshold is $P_d$, and wherein the transmission probability threshold is calculated by:

$$p_d = \alpha \frac{1}{\sum_{i=1}^{k} |Nsat_i|}$$

In this example or any other example, the data is transmitted from the terrestrial computing device to the constellation of orbital communication satellites on an uplink communication channel, different from a beacon communication channel over which the one or more beacon signals are detected. In this example or any other example, the data is transmitted from the terrestrial computing device to the constellation of orbital communication satellites using a slotted ALOHA randomized medium access protocol.

In an example, an orbital communication satellite comprises: a logic subsystem; and a storage subsystem holding instructions executable by the logic subsystem to: receive data transmitted by a plurality of terrestrial computing devices; and transmit a beacon signal to the plurality of terrestrial computing devices, the beacon signal including a traffic scaling parameter useable by the plurality of terrestrial computing devices to adjust a rate of data transmission by the plurality of terrestrial computing devices, and the traffic scaling parameter having a value set based at least in part on an estimated number of network collisions occurring while the orbital communication satellite receives the data transmitted by the terrestrial computing devices. In this example or any other example, the instructions are further executable to receive a device coverage estimate from a network management device, the device coverage estimate indicating an estimated number of terrestrial computing devices served by the orbital communication satellite, and wherein the device coverage estimate is included in the beacon signal. In this example or any other example, setting the value of the traffic scaling parameter includes comparing the estimated number of network collisions to an expected number of network collisions, and wherein the traffic scaling parameter causes a decrease in traffic transmitted by the plurality of terrestrial computing devices responsive to the estimated number of network collisions exceeding the expected number of network collisions. In this example or any other example, setting the value of the traffic scaling parameter includes comparing an observed channel inactivity parameter to a channel inactivity threshold, and wherein the traffic scaling parameter causes an increase in traffic transmitted by the plurality of terrestrial computing devices responsive to the observed channel inactivity parameter exceeding the channel inactivity threshold. In this example or any other example, the value of the traffic scaling parameter is further set based at least in part on a rate control instruction received from a network management device. In this example or any other example, the instructions are further executable to transmit the data received from the plurality of terrestrial computing devices to a ground network station. In this example or any other example, the beacon signal is broadcast to the plurality of terrestrial computing devices over a beacon communication channel, different from an uplink communication channel over which the data is received from the plurality of terrestrial computing devices. In this example or any other example, the estimated number of network collisions is estimated using a Channel Activity Detection (CAD) service of a LoRa networking protocol. In this example or any other example, the orbital communication satellite further comprises an omni-directional antenna, wherein the data is received from the plurality of terrestrial computing devices via the omni-directional antenna, and wherein the beacon signal is transmitted to the plurality of terrestrial computing devices via the omni-directional antenna.

In an example, a network management device comprises: a logic subsystem; and a storage subsystem holding instructions executable by the logic subsystem to: receive network telemetry data aggregated from a plurality of orbital communication satellites, the telemetry data indicative of an estimated number of network collisions occurring over a time interval while the plurality of orbital communication satellites receive data transmitted by a plurality of terrestrial computing devices; calculate an observed regional collision rate for a geographical region of interest based on the network telemetry data; and transmit a rate control instruction to a selected orbital communication satellite of the plurality of orbital communication satellites that is scheduled to provide coverage for the geographical region of interest, the rate control instruction generated based at least in part on the observed regional collision rate, and the rate control instruction useable by the selected orbital communication satellite to adjust a rate of data transmission by the plurality of terrestrial computing devices. In this example or any other example, the instructions are further executable to generate a device coverage estimate indicating an estimated number of terrestrial computing devices served by the selected orbital communication satellite in the geographical region of interest, and transmit the device coverage estimate to the selected orbital communication satellite. In this example or any other example, the instructions are further executable to, while the selected orbital communication satellite is providing coverage for the geographical region of interest, determine that a current number of network collisions reported by the selected orbital communication satellite over a second time interval exceeds the observed regional collision rate, and transmit an updated rate control instruction useable by the selected orbital communication satellite to reduce a data transmission rate by the plurality of terrestrial computing devices.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for network data communication comprises, at a terrestrial computing device:

detecting one or more beacon signals from a corresponding one or more orbital communication satellites of a constellation of orbital communication satellites;

adjusting a transmission probability threshold based at least in part on a detected quantity of the one or more orbital communication satellites; and transmitting data from the terrestrial computing device to the constellation of orbital communication satellites contingent on the transmission probability threshold being satisfied.

2. The method of claim 1, wherein the transmission probability threshold is adjusted such that a probability of data transmission on a current time step is inversely related to the detected quantity of the one or more orbital communication satellites.

3. The method of claim 1, wherein the one or more beacon signals each include a traffic scaling parameter, and wherein the transmission probability threshold is further adjusted based at least in part on the traffic scaling parameter.

4. The method of claim 1, further comprising, on each of a series of time steps, randomly generating a transmission check value, and wherein the data is transmitted from the terrestrial computing device to the constellation of orbital communication satellites contingent on the transmission check value satisfying the transmission probability threshold.

5. The method of claim 1, wherein each of the one or more beacon signals includes a device coverage estimate generated by a corresponding orbital communication satellite of the one or more orbital communication satellites, each device coverage estimate indicating an estimated number of terrestrial computing devices currently served by the corresponding orbital communication satellite.

6. The method of claim 5, wherein the device coverage estimate is $Nsat_i$, the detected quantity of the one or more orbital communication satellites is K, a traffic scaling parameter is $\alpha$, the transmission probability threshold is $P_d$, and wherein the transmission probability threshold is calculated by:

$$p_d = \alpha \frac{1}{\sum_{k=1}^{k} |Nsat_i|}$$

7. The method of claim 1, wherein the data is transmitted from the terrestrial computing device to the constellation of orbital communication satellites on an uplink communication channel, different from a beacon communication channel over which the one or more beacon signals are detected.

8. The method of claim 1, wherein the data is transmitted from the terrestrial computing device to the constellation of orbital communication satellites using a randomized medium access protocol.

9. An orbital communication satellite, comprising:

a logic subsystem including one or more processors; and a storage subsystem including one or more computer memory devices, the storage subsystem holding instructions executable by the logic subsystem to:

receive data transmitted by a plurality of terrestrial computing devices; and transmit a beacon signal to the plurality of terrestrial computing devices, the beacon signal including a traffic scaling parameter for controlling a rate of data transmission by the plurality of terrestrial computing devices, and the traffic scaling parameter having a value set based at least in part on an estimated number of network collisions occurring while the orbital communication satellite receives the data transmitted by the terrestrial computing devices.

10. The orbital communication satellite of claim 9, wherein the instructions are further executable to receive a device coverage estimate from a network management device, the device coverage estimate indicating an estimated number of terrestrial computing devices served by the orbital communication satellite, and wherein the device coverage estimate is included in the beacon signal.

11. The orbital communication satellite of claim 9, wherein setting the value of the traffic scaling parameter includes comparing the estimated number of network collisions to an expected number of network collisions, and wherein the traffic scaling parameter causes a decrease in traffic transmitted by the plurality of terrestrial computing devices responsive to the estimated number of network collisions exceeding the expected number of network collisions.

12. The orbital communication satellite of claim 9, wherein setting the value of the traffic scaling parameter includes comparing an observed channel inactivity parameter to a channel inactivity threshold, and wherein the traffic scaling parameter causes an increase in traffic transmitted by the plurality of terrestrial computing devices responsive to the observed channel inactivity parameter exceeding the channel inactivity threshold.

13. The orbital communication satellite of claim 9, wherein the value of the traffic scaling parameter is further set based at least in part on a rate control instruction received from a network management device.

14. The orbital communication satellite of claim 9, wherein the instructions are further executable to transmit the data received from the plurality of terrestrial computing devices to a ground network station.

15. The orbital communication satellite of claim 9, wherein the beacon signal is broadcast to the plurality of terrestrial computing devices over a beacon communication channel, different from an uplink communication channel over which the data is received from the plurality of terrestrial computing devices.

16. The orbital communication satellite of claim 9, wherein the estimated number of network collisions is estimated using a Channel Activity Detection (CAD) service of a LoRa networking protocol.

17. The orbital communication satellite of claim 9, further comprising an omni-directional antenna, wherein the data is received from the plurality of terrestrial computing devices via the omni-directional antenna, and wherein the beacon signal is transmitted to the plurality of terrestrial computing devices via the omni-directional antenna.

18. A network management device, comprising:

a logic subsystem including one or more processors; and a storage subsystem including one or more computer memory devices, the storage subsystem holding instructions executable by the logic subsystem to:

receive network telemetry data aggregated from a plurality of orbital communication satellites, the telemetry data indicative of an estimated number of network collisions occurring over a time interval while the plurality of orbital communication satellites receive data transmitted by a plurality of terrestrial computing devices;

calculate an observed regional collision rate for a geographical region of interest based on the network telemetry data; and transmit a rate control instruction to a selected orbital communication satellite of the plurality of orbital communication satellites that is scheduled to provide coverage for the geographical region of interest, the rate control instruction generated based at least in part on the observed regional collision rate, wherein the rate control instruction is used for controlling the selected orbital communication satellite to adjust a rate of data transmission by the plurality of terrestrial computing devices.

19. The network management device of claim 18, wherein the instructions are further executable to generate a device coverage estimate indicating an estimated number of terrestrial computing devices served by the selected orbital communication satellite in the geographical region of interest, and transmit the device coverage estimate to the selected orbital communication satellite.

20. The network management device of claim 18, wherein the instructions are further executable to, while the selected orbital communication satellite is providing coverage for the geographical region of interest, determine that a current number of network collisions reported by the selected orbital communication satellite over a second time interval exceeds the observed regional collision rate, and transmit an updated rate control instruction useable by the selected orbital communication satellite to reduce a data transmission rate by the plurality of terrestrial computing devices.

* * * * *